US010750033B2

(12) United States Patent
Ho et al.

(10) Patent No.: US 10,750,033 B2
(45) Date of Patent: Aug. 18, 2020

(54) ELECTRONIC PACKAGE INTERCEPTION, PARSING, AND ROUTING

(71) Applicant: Biscom Inc., Chelmsford, MA (US)

(72) Inventors: Shu-Kuang Ho, Carlisle, MA (US); Carlos Mainemer, Nashua, NH (US); Zhonghui Xiao, Westford, MA (US); William Ho, Carlisle, MA (US); Sharif Rahman, Fremont, CA (US)

(73) Assignee: Biscom Inc., Chelmsford, MA (US)

( * ) Notice: Subject to any disclaimer, the term of this patent is extended or adjusted under 35 U.S.C. 154(b) by 201 days.

(21) Appl. No.: 15/951,825

(22) Filed: Apr. 12, 2018

(65) Prior Publication Data
US 2019/0320075 A1 Oct. 17, 2019

(51) Int. Cl.
H04N 1/00 (2006.01)
G06F 21/60 (2013.01)
H04L 29/08 (2006.01)

(52) U.S. Cl.
CPC ....... H04N 1/00212 (2013.01); G06F 21/602 (2013.01); H04N 1/00214 (2013.01); H04L 67/06 (2013.01)

(58) Field of Classification Search
CPC ...... G06F 21/44; G06F 21/602; G06F 21/606; G06Q 20/401; H04L 41/0843; H04L 67/06; H04L 67/2842; H04N 1/00214; H04N 1/00212
See application file for complete search history.

(56) References Cited

U.S. PATENT DOCUMENTS

| 5,987,508 | A | 11/1999 | Agraharam |
| 7,054,905 | B1 | 5/2006 | Hanna |
| 2002/0018236 | A1 | 2/2002 | Musk |
| 2002/0091782 | A1* | 7/2002 | Benninghoff, III .. G06Q 20/401 709/206 |
| 2003/0187939 | A1 | 10/2003 | O'Brien |
| 2003/0225850 | A1 | 12/2003 | Teague |
| 2005/0027835 | A1* | 2/2005 | Raikar ................ H04L 41/0843 709/222 |
| 2008/0052364 | A1 | 2/2008 | Zhou |
| 2009/0049132 | A1 | 2/2009 | Livne Gutovski |
| 2010/0287246 | A1 | 11/2010 | Klos |
| 2013/0346522 | A1* | 12/2013 | Lennstrom .......... H04L 67/2842 709/206 |
| 2014/0019558 | A1 | 1/2014 | Pollack |

* cited by examiner

Primary Examiner — Nicholas R Taylor
Assistant Examiner — Michael Li
(74) Attorney, Agent, or Firm — Blueshift IP, LLC; Robert Plotkin

(57) ABSTRACT

A secure file transfer system and a secure file transfer method for routing an electronic file or a high-definition facsimile translated from the electronic file, from a sending computing device over a digital electronic communication network to a receiving computing device. The method may include receiving, from the sending computing device, an electronic package including a modified destination identifier including a domain associated with a secure file transfer system. The electronic package may include an electronic file as an attachment. The modified destination identifier may be a modified email address having one or more other characters substituted for an original at-symbol.

20 Claims, 2 Drawing Sheets

ELECTRONIC PACKAGE INTERCEPTION, PARSING, AND ROUTING

FIELD

The invention relates generally to the field of communications. In particular, the invention relates to electronic package interception, parsing, and routing.

BACKGROUND

Email and computer facsimile communications are ubiquitous in business applications due to the ease with which email messages and facsimile documents can be sent and received. However, obstacles exist with respect to certain email and computer facsimile communications. For example, email messages having large file attachments may not be deliverable to recipients due to attachment file size restrictions, either on the sender or recipient side of the communication. With respect to facsimiles, transmission may be limited to low resolution due to the limitations of facsimile transmission protocols.

Many solutions to such obstacles exist. For example, file transfer services are available online which allow users to transfer large files over the Internet securely. High resolution (including color) transmission of facsimile files is available using software-based sender and receiver applications.

However, a problem that arises with existing systems is that, in order to take advantage of the existing solutions, a sender of an email having a large attachment, or a high-resolution fax may still need to either login to an online service, execute a locally residing software application, or obtain a software plugin.

SUMMARY

According to one embodiment, a secure file transfer system for routing an electronic file or a high-definition facsimile translated from the electronic file may be provided. The secure file transfer system may route the electronic file, or the high-definition facsimile translated from the electronic file, from a sending computing device over a digital electronic communication network to a receiving computing device. The secure file transfer system may include a communications interface, a microprocessor, and a memory. The memory may include instructions which, when executed by the microprocessor, cause the microprocessor to perform the following operations. The secure file transfer system may receive, via the communications interface from the sending computing device, an electronic package including a modified destination identifier including a domain associated with the secure file transfer system. The electronic package may include the electronic file as an attachment. The secure file transfer system may determine at least one method of delivery for the electronic file based on the modified destination identifier. The at least one method of delivery may include at least one of secure file transfer and high-definition facsimile transmission. When the at least one method of delivery is determined to include secure file transfer, the secure file transfer system may transmit, via the communications interface, a recipient email message to an email address formed from the modified destination identifier. The email message may include a link to initiate secure download of the electronic file from the secure file transfer system. When the at least one method of delivery is determined to include high-definition facsimile transmission, the secure file transfer system may translate the electronic file into a high-definition facsimile file and transmit, via the communications interface, the high-definition facsimile file to a delivery identifier associated with the modified destination identifier.

Other features and advantages of various aspects and embodiments of the present invention will become apparent from the following description and from the claims.

BRIEF DESCRIPTION OF THE DRAWINGS

The above and further advantages of embodiments of this invention may be better understood by referring to the following description in conjunction with the accompanying drawings, in which like numerals indicate like structural elements and features in various figures. The drawings are not necessarily to scale, emphasis instead being placed upon illustrating the principles of embodiments of the invention.

DETAILED DESCRIPTION

Figure 1:
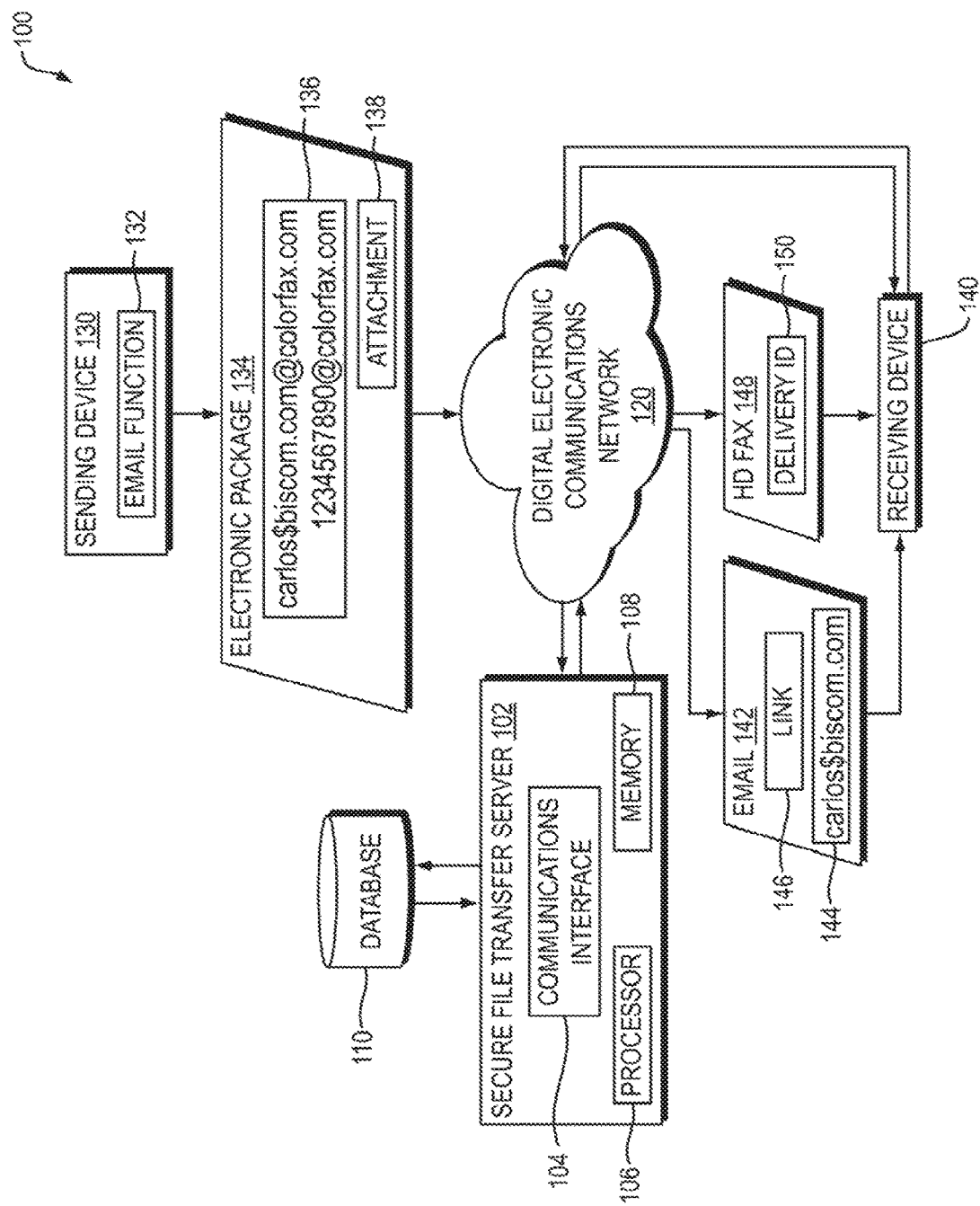
FIG. 1 is a dataflow diagram of a secure file transfer system for routing an electronic file or a high-definition facsimile translated from the electronic file, according to principles of the invention.

Reference will now be made in detail to exemplary embodiments of the present invention, examples of which are illustrated in the accompanying drawings, wherein like reference numerals refer to the like elements throughout. The exemplary embodiments are described below to explain the present invention by referring to the figures.

As used in the description of this application, the terms "a", "an" and "the" may refer to one or more than one of an element (e.g., item or act). Similarly, a particular quantity of an element may be described or shown while the actual quantity of the element may differ. For example, although one secure file transfer server 102 is shown and described with respect to FIG. 1, this is not intended to be limiting of the number of the actual number of computing devices acting as at least one secure file transfer server in various embodiments of the invention. Similarly, although the secure file transfer server 102 is shown and described as having a communications interface 104, a microprocessor 106, and a memory 108, this is not intended to be limiting of the number of actual communication interfaces, processors, and memories in various embodiments of the invention. The terms "and" and "or" may be used in the conjunctive or disjunctive sense and will generally be understood to be equivalent to "and/or". References to "an" or "one" embodiment are not necessarily all referring to the same embodiment. Elements from an embodiment may be combined with elements of another. No element used in the description of this application should be construed as critical or essential to the invention unless explicitly described as such. Further, when an element is described as "connected," "coupled," or otherwise linked to another element, it may be directly linked to the other element, or intervening elements may be present. The terms "alternative" and "alternatively" will generally be understood to be equivalent to "alternatively and/or additionally".

According to an embodiment, a secure file transfer system may be provided for routing an electronic file or a high-definition facsimile translated from the electronic file.

As described herein, the present invention provides a number of advantages. For example, in some embodiments of the present invention, a user does not need to have an account to use the secure file transfer system. The system may be accessible on virtually any computing platform and is compatible with any user's email client application and online mail services because embodiments of the present invention satisfy the formatting criteria applied by email standards. Further, the system architecture may reduce processing demand for the computing devices. These and other benefits are described below with respect to the various embodiments.

FIG. 1 is a dataflow diagram of a secure file transfer system 100 for routing an electronic file or a high-definition facsimile translated from the electronic file, in accordance with principles of the invention. An electronic package containing the electronic file may be intercepted and parsed. The secure file transfer system 100 may route the electronic file or a high-definition facsimile translated from the electronic file, from a sending computing device 130 over a digital electronic communication network 120 to a receiving computing device 140. The digital electronic communication network 120 may include at least one of any type of network, whether wired, wireless, or both. For example, the digital electronic communication network may include one or more of a Personal Area Network (PAN), a Local Area Network (LAN), a Home Area Network (HAN), a Campus Area Network (CAN), a Metropolitan Area Network (MAN), a Wide Area Network (WAN), and a Global Area Network such as the Internet.

The system 100 may include a secure file transfer server 102. The secure file transfer server 102 may include a communications interface 104, a microprocessor 106, and a memory 108. The memory 108 may include instructions which, when executed by the microprocessor 106, cause the microprocessor to perform operations inherently rooted in technology. Specifically, the operations relate to email, file transfer, and facsimile transmission, as described in more detail herein. Although the microprocessor 106 is described as a "microprocessor", more generally the microprocessor 106 may be implemented as any circuit or combination of circuits. Similarly, although a single microprocessor 106 is shown in FIG. 1, it is again noted that the actual quantity of processors, like other elements, may differ.

The secure file transfer server 102 may include a database 110 storing account records. Although the database 110 is described as a "database", more generally the database 110 may be implemented as any data structure or collection of data structures. Similarly, although the database 110 is shown as being co-located with the secure file transfer server 102, the database 110, like other elements, may be otherwise located (e.g., remote from the secure file transfer server 102).

The system 100 may further include the sending computing device 130 to transmit an electronic package 134 (or to initiate transmission thereof). For example, the sending computing device 130 may include an email function 132. The sending computing device 130 may be one of many different types of computing devices, including a laptop computing device, a desktop computing device, a tablet computing device, a telephone computing device, a browser terminal computing device, or a personal data assistant computing device capable of email functionality.

The email function 132 may be provided by a web-based email service through a browser application. Alternatively, the email function 132 may be provided by an email client application that may be in communication with an email server. In yet another alternative embodiment, a messaging client such as a messenger application of a telephone computing device may provide the email function 132. As discussed more below, the term "sending computing device" may refer to the device physically located with the sending user, and also a server or other device in communication therewith.

It should be noted that a benefit of one or more embodiments of the present invention is that there is no need for the sending computing device 130 to obtain and execute a locally residing software application (beyond an existing email client or browser) or obtain a software plugin in conjunction with the email function 132. This in turn enables embodiments of the present invention using a variety of computing platforms, including, for example, a Microsoft Windows™-based personal computing device, an Apple macOS™-based personal computing device, a Google Android™ telephone or tablet computing device, an Apple iPhone™ telephone computing device, an Apple iPad™ tablet computing device, a Linux™ based PDA computing device, or the like. Similarly, embodiments of the present embodiment are enabled with a variety online mail services, including, for example, Google Gmail™, Microsoft Outlook™, or the like. By not requiring client application software or plugins, processing of the secure file transfer system and the sending and receiving devices may be made more efficient thereby improving system performance.

As another benefit, in some embodiments of the present invention, a sending user or a receiving user does not need to have an account with the secure file transfer system 100 in order to use the system 100. This in turn enables anyone to use the system 100 using their own computing devices 130, 140, and their own email function 132. Login to an online service may not be necessary in one or more embodiments.

Returning to FIG. 1, the sending computing device 130 may generate the electronic package 134. For example, an email may be generated by the email function 132 of the sending computing device 130.

The electronic package 134 may include a modified destination identifier 136 including a domain associated with the secure file transfer system 100 (e.g. associated with the secure file transfer server 102).

For example, a modified email address (e.g., "carlos$biscom.com") may be input into a recipient (i.e., "To") field of an email message. The modified email address may have one or more other characters substituted for an original at-symbol (e.g., "$" or "!" substituted for "@"). In addition, the modified email address may be combined with the domain associated with the secure file transfer system 100 by a new at-symbol (e.g., "carlos$biscom.com@anydomain.com"). As discussed below, the user may enter this modified address (including the domain associated with the secure file transfer system 100), or a function may be provided to perform such a modification.

As another example of a modified destination identifier 136, a plain old telephone service (POTS) format telephone number corresponding to a high-definition facsimile destination identifier may be input into a recipient field of an email address. The POTS format telephone number may be ten (10) digits, or more or fewer. The POTS format telephone number may be combined with the domain associated with the secure file transfer system 100 by an at-symbol (e.g., "1234567890@anydomain.com"). The user may enter this modified destination identifier, or a function may be provided to perform this modification.

The secure file transfer server 102 may receive, via the communications interface 104 from the sending computing device 130, the electronic package 134 including the modified destination identifier including the domain associated with the secure file transfer system. When a sending user is using an email client in communication with an email server online, or when the sending user is using an online email service, the sending computing device 130 may include the email server online or a server of the online email service, in addition to the device local to the sending user.

The electronic package 134 may further include the electronic file 138. For example, the electronic file 138 may be received as an email attachment 138. In an embodiment, there may be no limitation on the size of the email attachment. The electronic file 138 may be encrypted, either as received or by the secure file transfer server 102. In an embodiment, the electronic package 134 may be received via encrypted communication.

The secure file transfer server 102 may store tracking information in a log file. For example, the secure file transfer server 102 may track information associated with receiving the electronic package 134, such as when (e.g., timestamp information) and from where (e.g., sender email address, sending computing device IP address).

The secure file transfer server 102 may determine at least one method of delivery for the electronic file based on the modified destination identifier. Methods of delivery may include at least one of secure file transfer and high-definition facsimile transmission.

The determination of the method of delivery may be made by referring to the secure file transfer database 110. The secure file transfer database 110 may include account records for users of the secure file transfer system 100.

Stored preferences may be used in determining a method of delivery. In an embodiment, account records may store a preferred method of delivery. For example, a record associated with the modified destination identifier 136 (e.g., "carlos$biscom.com") may exist in the database 110, and may indicate that the user associated with the modified destination identifier 136 prefers delivery by high-definition facsimile transmission. Alternatively, a user may prefer delivery by secure file transfer, or by both high-definition facsimile transmission and by secure file transfer. The record may alternatively be associated with at least one portion of the modified destination identifier 136 (e.g., "carlos" or "biscom" or "carlos" and "biscom"), or with an email address formed from the modified destination identifier (e.g., "carlos@biscom.com").

The record in the database 110 may store the email address formed from the modified destination identifier (e.g., carlos@biscom.com from "carlos$biscom.com" or "carlos$biscom.com@anydomain.com"). Storage of the email address formed from the modified destination identifier may negate the repeated forming of the email address. The record may include a delivery identifier associated with the preferred method of delivery. For example, a high-definition facsimile address (which may be, for example, an internet protocol address) may be stored in a user record.

Records may also be associated with a sender identifier. For example, a sender email address may be stored in conjunction with a preferred method of delivery. For example, a record associated with "bill@email.com" may indicate that this user prefers transmission by secure file transfer. Consideration of preferences associated with both the modified destination identifier and the sender identifier may be considered and, if necessary due to conflicting preferences, weighted.

In an embodiment, preferences may be explicitly input by a user. For example, a user may be explicitly prompted to select at least one method of delivery, or may include a switch among methods of delivery in the electronic package (e.g., in the body of an email message). Alternatively, preferences may be inferred from past choices. For example, machine learning may be used to infer preferences (e.g., "carlos$biscom.com" almost always receives using secure file transfer from "bill@email.com", infer preference delivery using secure file transfer).

Defaults may be used in determining a method of delivery. For example, a record associated with the modified destination identifier 136 (e.g., "jo$biscom.com") may exist in the database 110, but may not indicate any preferences with respect to a method of delivery. Similarly, a record associated with the sender identifier may exist, but may not indicate any preferences with respect to a method of delivery. The default method of delivery may be set to secure file transfer. Alternatively, the default method of delivery may be set to via high definition facsimile transmission.

Embodiments of the present invention may enable the modified destination identifier 136 to include parameters and associated values, which may be parsed by the secure file transfer server 102 and applied to the file transfer process in any of a variety of ways. For example, the modified destination identifier 136 may include a parameter and associated value, and the secure file transfer server 102 may parse the modified destination identifier 136 to identify the parameter and associated value, and assign the identified value to the identified parameter, potentially overriding a default value of the identified parameter. An example of a modified destination identifier containing such parameters and associated values is "carlos$biscom.com!A#B*C@anydomain.com," where A, B, and C may be parameters and associated values. For example, A may be "deliveryMethod=SFT" to indicate that the parameter "deliveryMethod" should be assigned the value "SFT" (secure file transfer). The secure file transfer server 102 may apply such parameter values to their associated parameters before or after performing the other functions performed herein. More generally, any of A, B, and C may indicate any commands to be performed as a pre-process or post-process to the other functions performed by the secure file transfer server 102. The modified destination identifier 136 may include any number of such commands (including zero).

A format of the modified destination identifier 136 may be used in determining a method of delivery. For example, if the modified destination identifier is in the format of a modified email address combined with the server domain (e.g., "carlos$biscom.com@anydomain.com"), the secure file transfer server 102 may determine that the method of delivery for the electronic file 138 is by secure file transfer. Similarly, if the modified destination identifier 136 is in the format of a plain old telephone service (POTS) format telephone number combined with the server domain, the secure file transfer server 102 may determine that the method of delivery for the electronic file 138 is by high-definition facsimile.

When the at least one method of delivery is determined to include secure file transfer, the secure file transfer server 102 may transmit, via the communications interface 104, a recipient email message 142 to an email address 144 formed from the modified destination identifier, the email message 142 including a link 146 to initiate secure download of the electronic file 138 from the secure file transfer server 102.

The transmitting may include generating the email address 144 formed from the modified destination identifier 136 by replacing the one or more characters (e.g., "$") with the original at-symbol and removing the domain associated with the secure file transfer server 102 and the new at-symbol (e.g., "@anydomain.com"). Then the secure file transfer server 102 may transmit the recipient email message 142 to the email address 144.

The link 146 to initiate secure download of the electronic file 138 from the secure file transfer server 102 may, upon selection by a receiving user, send a request to the secure file transfer server 102 for the electronic file 138. The secure file transfer server 102 may verify the receiving computing device 140. Upon verification, the secure file transfer server 102 may transmit the electronic file 138 to the receiving computing device 140. In an embodiment, the secure file transfer server 102 may transmit the electronic file using a secure communication. An embodiment where the secure file transfer server 102 receives the electronic package and provides delivery of electronic file 138 (such as by link) from the secure file transfer server negates file size limitations imposed by the sender's and the recipient's email client and server. In another embodiment where a sender uses an email client plugin, the plugin may upload large file attachments directly to the secure file transfer server 102, without using an email protocol, thereby negating email attachment limitations on behalf of the sender. Such embodiments enable the transfer of large electronic files which could not be sent directly by email to due file size limitations on email attachments.

The secure file transfer server 102 may track information associated with receiving the transmitting of the recipient email message 142 (e.g., timestamps, recipient email address, IP address information, later receipt of request for electronic file 138, and transmission of the electronic file).

When the at least one method of delivery is determined to include high-definition facsimile transmission, the secure file transfer server 102 may translate the electronic file 138 into a high-definition facsimile file 148. The secure file transfer server 102 may transmit, via the communications interface 104, the high-definition facsimile file 148 to a delivery identifier 150 associated with the modified destination identifier 136.

The transmitting may include searching the database 110 of the secure file transfer system 100 for POTS format telephone number. If the POTS format telephone number is found in the database 110, an associated delivery identifier may be discovered, and the high-definition facsimile file may be transmitted to the delivery identifier 150. If the POTS format telephone number does not exist in the database 110, that is, if a delivery identifier 150 cannot be found in the database 110, the POTS format telephone number may be used as the delivery identifier. The action to be performed by the system 100 when the POTS format telephone number does not exist in the database may be configured in any of a variety of ways. For example, this action may be configurable by the user, so that the user can specify what action the system 100 is to take in response to determining that the POTS format telephone number does not exist in the database.

Figure 2:
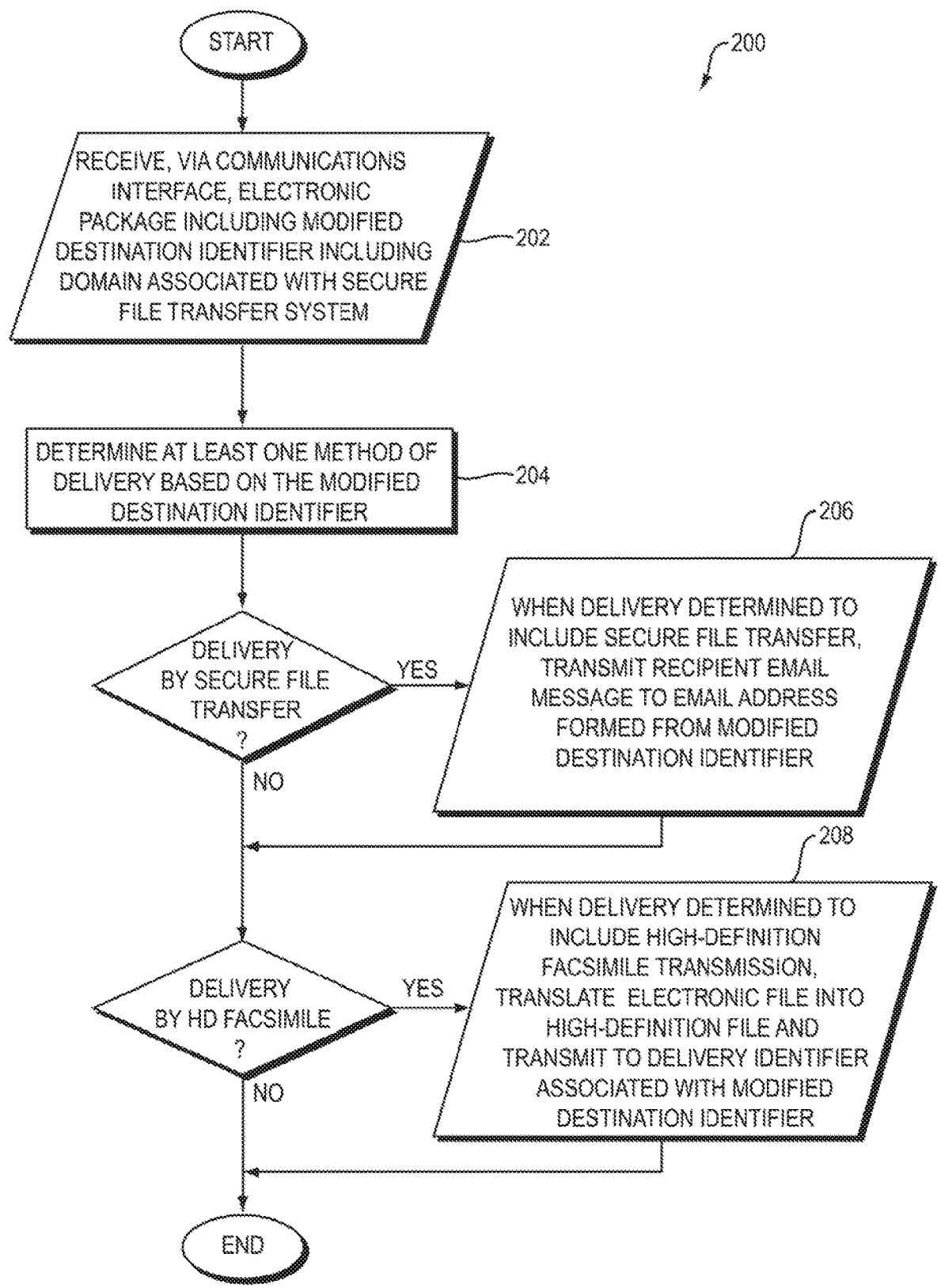
FIG. 2 is a flowchart of a secure file transfer method for routing an electronic file or a high-definition facsimile translated from the electronic file, according to principles of the invention.

An operation of a system, such as the secure file transfer system 100 of FIG. 1, is now described with respect to FIG. 2. FIG. 2 is a flowchart of a secure file transfer method 200 for routing an electronic file or a high-definition facsimile translated from the electronic file, in accordance with principles of the invention.

In operation 202, an electronic package 134 including a modified destination identifier 136 including a domain associated with the secure file transfer system 100 may be received via a communications interface 104. The electronic package 134 may include the electronic file 138 as an attachment.

For example, a sending user may use a sending computing device 130 to generate an email message 142. The sending user may enter an email address of a recipient in a "To" field, albeit slightly modified. For example, for the email address "carlos@biscom.com", the sending user may enter the address with one or more other characters substituted for an original at-symbol (e.g., "$" substituted for "@"). The modified email address may be combined by the sending user with the domain associated with the secure file transfer system 100 by a new at-symbol resulting in "carlos$biscom.com@anydomain.com".

Alternatively, although it is a benefit of one or more embodiments of the present invention that there is no need for the sending user to login to a special online service, such an online service may be accessible in an alternative embodiment. In such an alternative embodiment, a sending user may be presented with an interface resembling an email message generation interface. The sending user may simply enter an email address of a recipient into a "To" field, and the online service may modify the email address of the recipient by substituting one or more other characters for an original-at symbol and combine the recipient email address with the domain associated with the secure file transfer system 100. Modification may take place during or after entry of the recipient email address, or upon initiating transmission of the message (e.g., upon selecting a "Send" option). Modification may be visible to the sending user, or alternatively, may not be visible to the sending user. In an embodiment using an online service of the secure file transfer system, the device used by the sending user and the routines providing the interface resembling the email message generation interface may be considered the sending computing device.

In operation 204, at least one method of delivery for the electronic file 138 may be determined based on the modified destination identifier 136. The at least one method of delivery may include at least one of secure file transfer and high-definition facsimile transmission. Stored preferences in a database 110, whether explicitly input by a user or inferred, may be used in determining a method of delivery. Defaults may be used in determining a method of delivery. Similarly, a format of the modified destination identifier may be used in determining a method of delivery. The particular delivery formats shown in FIG. 2 (namely, secure file transfer and HD fax) are merely examples and do not constitute limitations of the present invention. Particular embodiments of the present invention need not use both of these delivery methods, and may use delivery methods in addition to or instead of these delivery methods.

If the method of delivery is determined to include secure file transfer, the method may proceed to operation 206 and the secure file transfer server 102 may transmit, via the communications interface 104, a recipient email message 142 to an email address 144 formed from the modified destination identifier 136, the email message 142 including a link 146 to initiate secure download of the electronic file 138 from the secure file transfer server 102.

If the method of delivery is determined to include high-definition facsimile transmission, the method may proceed to operation 208 and the secure file transfer server 102 may translate the electronic file 138 into a high-definition facsimile file 148. The secure file transfer server 102 may transmit, via the communications interface 104, the high-definition facsimile file 148 to a delivery identifier 150 associated with the modified destination identifier 136.

Various embodiments of the present invention are inherently rooted in computer and networking technology and do not have analogs outside of computer and networking technology. For example, embodiments of the present invention address a problem which is inherently rooted in computer and networking technology, namely the problem of how to transmit large digital files and high-definition faxes from one computing device to another using only standard software that is installed on such computing devices. Similarly, embodiments of the present invention solve this technical problem using a solution which is inherently rooted in computer and networking technology, such as a computer-implemented system and method which receive a modified destination identifier (e.g., "carlos$biscom.anydomain.com") using only a standard email client or web browser, without any additional plugins or modifications, and which use the modified destination identifier to derive a destination identifier (e.g., "carlos@biscom.com") and to send a digital file or high-definition fax to a recipient over a digital communication network using the derived destination identifier.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

For example, translation of the electronic file into a high-definition facsimile file may occur in conjunction with delivery using the secure file transfer. As another example, transmission over unsecured links may be utilized in addition to or in place of transmission over secured links.

As yet another example, in alternate implementations, all or part of the software functions described herein may be implemented in hardware, for example, in a programmable gate array (PGA), programmable logic device (PLD), application specific integrated circuit (ASIC), or other suitable IC chip. Portions of the software functions may be implemented by plural IC chips in communication with each other.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention use computers to receive messages, to parse text within those messages, to send email messages over digital communication networks, to transmit faxes over digital communication networks, and to transmit digital files over digital communication networks. Such components are inherently computer-implemented and provide a technical solution to the technical problem of transmitting digital files and faxes over communication networks.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A secure file transfer system for routing an electronic file or a high-definition facsimile translated from the electronic file, from a sending computing device over a digital electronic communication network to a receiving computing device, the secure file transfer system including:
    a communications interface;
    a microprocessor; and
    a memory comprising instructions which, when executed by the microprocessor, cause the microprocessor to:
    (A) receive, via the communications interface from the sending computing device, an electronic package including a destination identifier, the destination identifier including: (1) a first part specifying a recipient of the electronic package; and (2) a domain associated with the secure file transfer system, wherein the electronic package includes the electronic file as an attachment;
    (B) determine at least one method of delivery for the electronic file based on the modified destination identifier, the at least one method of delivery including at least one of secure file transfer and high-definition facsimile transmission, the determining comprising:
        (B)(1) determining whether the destination identifier includes a modified email address including at least one other character substituted for an original at-symbol;
        (B)(2) determining that the at least one method of delivery is secure file transfer in response to determining that the destination identifier includes the modified email address;
        (B)(3) determining whether the destination identifier includes a plain old telephone service (POTS) format telephone number; and
        (B)(4) determining that the at least one method of deliver is high-definition facsimile transmission in response to determining that the destination identifier includes the plain old telephone service (POTS) format telephone number;
    (C) when the at least one method of delivery is determined to include secure file transfer:
        (C)(1) generate an email address from the modified email address by replacing the at least one other character with the original at-symbol; and
        (C)(2) transmit, via the communications interface, a recipient email message to the email address generated from the modified email address, the email message including a link to initiate secure download of the electronic file from the secure file transfer system; and
    (D) when the at least one method of delivery is determined to include high-definition facsimile transmission, translate the electronic file into a high-definition facsimile file and transmit, via the communications interface, the high-definition facsimile file to a delivery identifier associated with the modified destination identifier.

2. The secure file transfer system of claim 1, wherein the electronic package comprises a sender email message.

3. The secure file transfer system of claim 2, wherein the electronic file is received as an email message attachment.

4. The secure file transfer system of claim 1, wherein the POTS format telephone number is in ten-digit numeric form.

5. The secure file transfer system of claim 1, wherein (D) comprises:
    (D)(1) searching a database for the delivery identifier associated with the POTS format telephone number; and
    (D)(2) transmitting the high-definition facsimile file to the delivery identifier.

6. The secure file transfer system of claim 1, wherein (D) comprises:
    (D)(1) searching a database for the delivery identifier associated with the POTS format telephone number; and
    (D)(2) when the delivery identifier associated with the POTS format telephone number does not exist in the database, treating the POTS format telephone number as the delivery identifier and transmitting the high-definition facsimile to the delivery identifier.

7. The secure file transfer system of claim 1, wherein the electronic file is encrypted.

8. The secure file transfer system of claim 7, wherein the link initiates secure download of the electronic file that is encrypted, via a secure connection between the secure file transfer system and the receiving computing device.

9. The secure file transfer system of claim 1, further comprising storing tracking information associated with operations (A), (C), and (D) in a log file of the secure file transfer system.

10. The secure file transfer system of claim 1, further comprising:
    (E) when the at least one method of delivery is determined to include secure file transfer, receiving a request to initiate secure download of the electronic file;
    (F) verifying the receiving computing device; and
    (G) transmitting the electronic file from the secure file transfer system to the receiving computing device.

11. A secure file transfer method for routing an electronic file or a high-definition facsimile translated from the electronic file, from a sending computing device over a digital electronic communication network to a receiving computing device, comprising:
    (A) receiving, from the sending computing device, an electronic package including a destination identifier, the destination identifier including: (1) a first part specifying a recipient of the electronic package; and (2) a domain associated with a secure file transfer system, wherein the electronic package includes an electronic file as an attachment;
    (B) determining at least one method of delivery for the electronic file based on the modified destination identifier, the at least one method of delivery including at least one of secure file transfer and high-definition facsimile transmission, the determining comprising:
        (B)(1) determining whether the destination identifier includes a modified email address including at least one other character substituted for an original at-symbol;

(B)(2) determining that the at least one method of delivery is secure file transfer in response to determining that the destination identifier includes the modified email address;

(B)(3) determining whether the destination identifier includes a plain old telephone service (POTS) format telephone number; and (B)(4) determining that the at least one method of deliver is high-definition facsimile transmission in response to determining that the destination identifier includes the plain old telephone service (POTS) format telephone number;

(C) when the at least one method of delivery is determined to include secure file transfer:

(C)(1) generating an email address from the modified email address by replacing the at least one other character with the original at-symbol; and (C)(2) transmitting, via the communications interface, a recipient email message to the email address generated from the modified email address, the email message including a link to initiate secure download of the electronic file from the secure file transfer system; and (D) when the at least one method of delivery is determined to include high-definition facsimile transmission, translating the electronic file into a high-definition facsimile file and transmitting, via the communications interface, the high-definition facsimile file to a delivery identifier associated with the modified destination identifier.

12. The secure file transfer method of claim 11, wherein the electronic package comprises a sender email message.

13. The secure file transfer method of claim 12, wherein the electronic file is received as an email message attachment.

14. The secure file transfer method of claim 11, wherein the POTS format telephone number is in ten-digit numeric form.

15. The secure file transfer method of claim 11, wherein (D) comprises:

(D)(1) searching a database for the delivery identifier associated with the POTS format telephone number; and (D)(2) transmitting the high-definition facsimile file to the delivery identifier.

16. The secure file transfer method of claim 11, wherein (D) comprises:

(D)(1) searching a database for the delivery identifier associated with the POTS format telephone number; and (D)(2) when the delivery identifier associated with the POTS format telephone number does not exist in the database, treating the POTS format telephone number as the delivery identifier and transmitting the high-definition facsimile to the delivery identifier.

17. The secure file transfer method of claim 11, wherein the electronic file is encrypted.

18. The secure file transfer method of claim 17, wherein the link initiates secure download of the electronic file that is encrypted, via a secure connection between the secure file transfer system and a receiving computing device.

19. The secure file transfer method of claim 11, further comprising storing tracking information associated with operations (A), (C), and (D) in a log file of the secure file transfer system.

20. The secure file transfer method of claim 11, further comprising:

(E) when the at least one method of delivery is determined to include secure file transfer, receiving a request to initiate secure download of the electronic file;

(F) verifying a receiving computing device; and (G) transmitting the electronic file from the secure file transfer system to the receiving computing device.

* * * * *